(12) United States Patent
Laronga et al.

(10) Patent No.: US 11,353,608 B2
(45) Date of Patent: Jun. 7, 2022

(54) METHOD FOR DETERMINING A PROPERTY OF A MATERIAL BEHIND A BOREHOLE CASING

(71) Applicant: Schlumberger Technology Corporation, Sugar Land, TX (US)

(72) Inventors: Robert Laronga, Houston, TX (US); Ram Sunder Kalyanraman, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 817 days.

(21) Appl. No.: 16/145,444

(22) Filed: Sep. 28, 2018

(65) Prior Publication Data

US 2019/0113643 A1    Apr. 18, 2019

Related U.S. Application Data

(60) Provisional application No. 62/571,826, filed on Oct. 13, 2017.

(51) Int. Cl.
*G01V 1/30* (2006.01)
*G01V 1/34* (2006.01)
*E21B 47/005* (2012.01)

(52) U.S. Cl.
CPC ............ *G01V 1/306* (2013.01); *E21B 47/005* (2020.05); *G01V 1/34* (2013.01); *G01V 2210/6226* (2013.01)

(58) Field of Classification Search
CPC .. G01V 1/306; G01V 1/34; G01V 2210/6226; E21B 47/005

USPC ............................................................. 367/7
See application file for complete search history.

(56) References Cited

U.S. PATENT DOCUMENTS

| | | | |
|---|---|---|---|
| 9,823,374 B2 * | 11/2017 | McCafferty | ........... E21B 47/113 |
| 2005/0068036 A1 | 3/2005 | Wang et al. | |
| 2009/0132169 A1 | 5/2009 | Bordakov | |
| 2009/0262603 A1 | 10/2009 | Hurley et al. | |

(Continued)

FOREIGN PATENT DOCUMENTS

WO    WO2009126881 A2    10/2009

OTHER PUBLICATIONS

Zhang T, Switzer P. Journal AG (2006) Filter-based classification of training image patterns for spatial simulation. Mathematical Geology vol. 38, No. 1, Jan. 2006: pp. 63-80.

(Continued)

*Primary Examiner* — Daniel L Murphy
(74) *Attorney, Agent, or Firm* — Rodney Warfford (57) ABSTRACT

The disclosure relates to a method of determining at least a property of a material situated behind a casing of a borehole, wherein an image of a imaging parameter of the material, such as acoustic impedance, has been obtained. The method comprising identifying zones of the image corresponding to disturbance zones, based in particular on values of the imaging parameters or other measured parameters, deleting the data of the imaging parameter in each of the disturbance zones, reconstructing for each zone, data of the imaging parameter from the data of imaging parameter at the neighboring zones, and determining at least a property of the material based on the reconstructed image.

20 Claims, 5 Drawing Sheets

(56) References Cited

U.S. PATENT DOCUMENTS

| | | |
|---|---|---|
| 2010/0052687 A1 | 3/2010 | Forgang et al. |
| 2013/0051685 A1 | 2/2013 | Shechtman et al. |
| 2013/0336541 A1 | 12/2013 | Spencer Elkington et al. |
| 2014/0149042 A1 | 5/2014 | Zhang et al. |
| 2014/0254884 A1 | 9/2014 | Elkington et al. |
| 2016/0130930 A1 | 5/2016 | Gelman et al. |

OTHER PUBLICATIONS

Hurley N, Zhang T (2011) Method to generate fullbore images using borehole images and multi-point statistics. SPE Reservoir Evaluation & Engineering 14:204-214.

International Search Report and Written Opinion issued in the related PCT application PCT/US2014/041702 dated Apr. 17, 2015 (13 pages).

Tuanfeng Zhang, Filter-Based Training Pattern Classification for Spatial Pattern Simulation, Stanford, PHD thesis, Mar. 30, 2006. (153 pages).

International Preliminary Report on Patentability issued in the related PCT application PCT/US2014/041702 dated Dec. 15, 2015 (7 pages).

\* cited by examiner

METHOD FOR DETERMINING A PROPERTY OF A MATERIAL BEHIND A BOREHOLE CASING

BACKGROUND

The invention relates generally to investigating of a borehole, and to the determining of at least a property of a material behind a casing located in a borehole Acoustical investigating is in particular widely used to investigate casings found in boreholes. Typically acoustical investigating uses ultrasonic waves.

Boreholes penetrating an earth formation generally comprise a wall with an annular space filled with set cement. After the cement has set in the annular space of the casing it is common practice to use acoustic non-destructive testing methods to evaluate its integrity. This evaluation is of prime importance since the cement must guarantee zonal isolation between different formations in order to avoid flow of fluids from the formations (water, gas, oil) through the annular space of the casing.

It is more particularly known to determine a parameter of the material behind the casing, such as acoustic impedance. An image of such parameter is generally used for monitoring a property of the cement. For instance, acoustic impedance is used for monitoring the quality of the cement.

However, such image may show disturbances that are due to other elements than the material that is under investigation, such elements being for instance perforated holes or other defects/damages to the casing. There is a need for a corrected image that takes into account the disturbances and is able to give a predicted data relative to the parameter of the material behind the casing in the zones of the disturbances.

SUMMARY

The disclosure presents a method for determining at least a property of a material behind an affected/altered borehole casing that applies a correction on the acquired images to give more accurate information regarding the material, and in particular the cement quality.

The disclosure relates to a method of determining at least a property of a material situated behind a casing of a borehole, wherein an image of a imaging parameter of the material, such as acoustic impedance, has been obtained. The method comprising identifying zones of the image corresponding to disturbance zones, based for instance on values of the imaging parameters or other measured parameters, deleting the data of the imaging parameter in each of the disturbance zones, reconstructing for each zone, data of the imaging parameter from the data of imaging parameter at the neighboring zones, and determining at least a property of the material based on the reconstructed image.

The disclosure also relates to a non-transitory tangible computer-readable medium, being stored with a computer program including instructions for performing the above-mentioned method.

It also relates to a system for determining at least a property of a material behind a casing of a borehole based on an image of an imaging parameter of the material, wherein the system comprises a set of processors comprising one or more processor, configured to perform the above-mentioned method.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, some features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.'

As discussed above, logging and in particular acoustic logging is already known in order to assess a wellbore and in particular the quality of the cement that is situated behind the casing.

Figure 1:
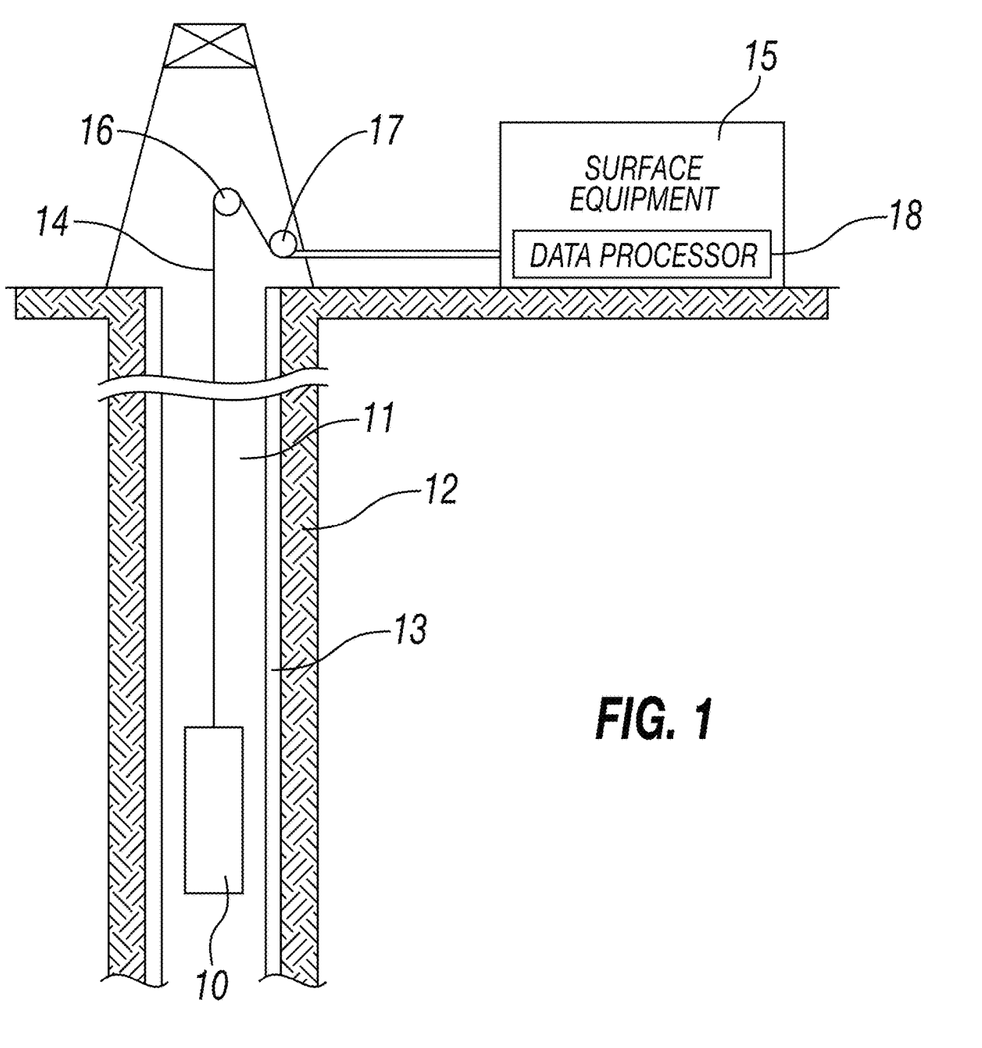
FIG. 1 is a schematic drawing of an embodiment of a system for performing a logging operation.

Turning now to FIG. 1, a schematic diagram of a logging operation is shown. Tool, or sonde, 10 for evaluating cement quality is located in borehole 11 penetrating earth formation 12. Casing 13 is cemented to the walls of the borehole, as explained in detail with reference to FIG. 3, below. The sonde is preferably lowered in the borehole, for instance by armored multi-conductor cable 14, as represented on the FIG. 1 and slowly raised by surface equipment 15 over sheave wheel 16 while cement quality measurements are performed. The depth of the tool is measured by depth gauge 17, which measures cable displacement.

Sonde 10 may measure cement quality by emitting an acoustic pulse and analyzing its return waveform. The sonde measures cement quality by emitting acoustic excitation pulses and analyzing the return waveforms produced as a result of reflections from the casing, as well as reverberations of the casing. The return waveforms can be analyzed by the sonde in situ, analyzed by data processor 18 at the surface, or stored, either in the sonde or at the surface via a memory, for analysis at a remote location. In an embodiment, the return waveform data is transferred to data processor 18 by cable 14, where the cement quality is determined. The system may also include a plurality of processors, for instance a processor in the tool, a processor at the surface connected to the tool and/or a processor remote from the rig site that may analyze further data that are acquired at the rig site. Any other configuration of the sets of processors is possible as long as the processors are able to communicate via a wired or wireless network.

Figure 2:
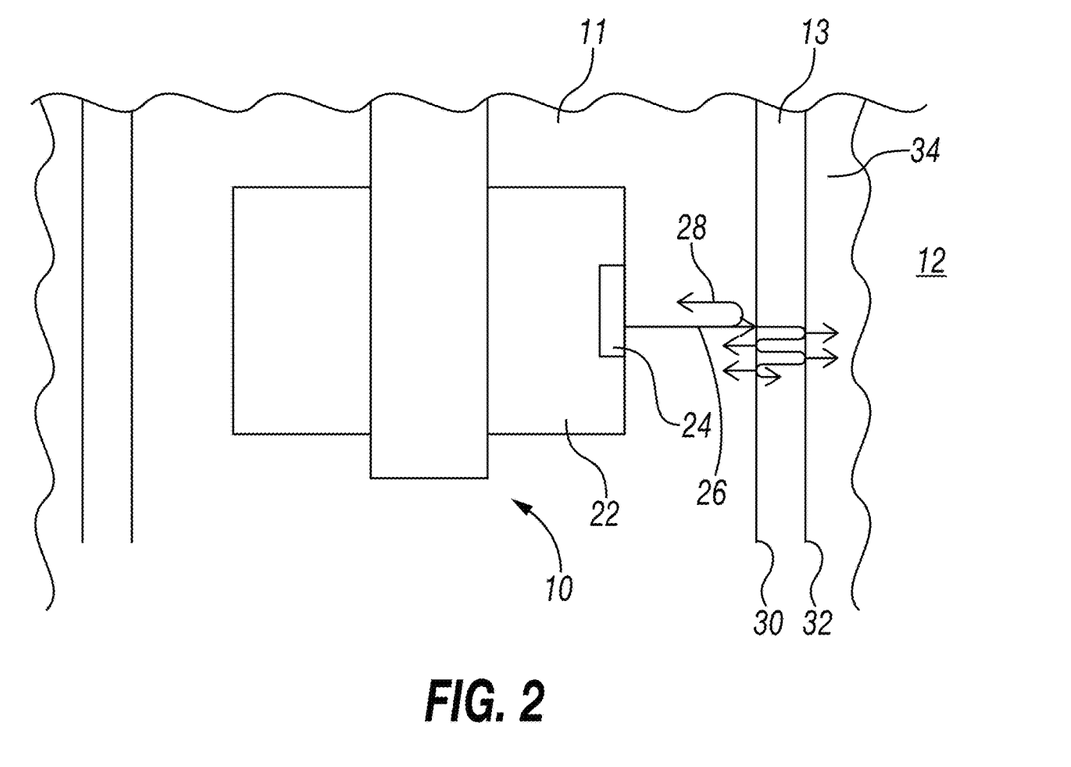
FIG. 2 shows details of the logging system of FIG. 1 relative to an embodiment of acoustic logging.

An example of a tool for evaluating the cement quality is Schlumberger UltraSonic Imager Tool (USIT), shown schematically on FIG. 2. The sonde 10 of the USIT tool includes more particularly a rotating sub 22 on which is mounted a transducer 24 for emitting ultrasonic pulses 26, generally between 200 and 700 kHz, and measuring received ultrasonic waveforms 28 reflected from the internal 30 and external 32 casing interfaces. This is a typical pulse-echo measurement. Different characteristics of the received acoustic waveforms 28 may be determined, such as echo amplitude, transit time, resonant frequency or bandwidth of the resonance, which enables to determine several parameters relative to the casing and the cement 34 situated behind the casing, based on one or several of these characteristics and/or additional measurements, in particular relative to mud that may be present in the borehole. For instance, echo amplitude may indicate casing rugosity, internal casing radius may be calculated from echo transit time, casing thickness is obtained based on resonant frequency and from the bandwidth of the resonance, acoustic impedance of the material behind the casing is determined.

Figure 3:
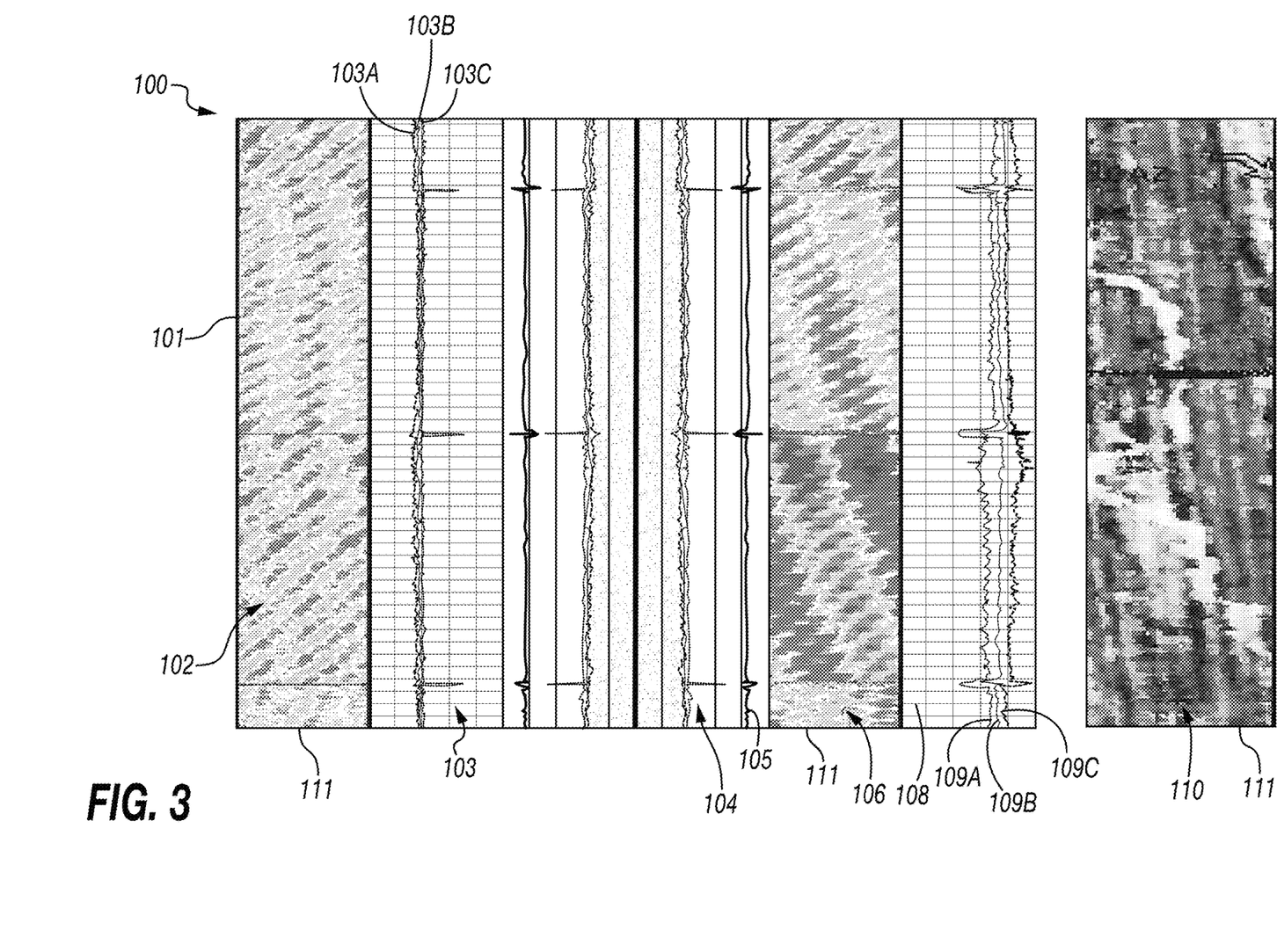
FIG. 3 shows a set of logs obtained with a logging system such as the one of FIG. 2.

On FIG. 3, exemplary logs 100 obtained from USIT are shown. Each log shows a characteristic of the wellbore logged against depth (vertical axis 101) and obtained at least in part from the data acquired by the ultrasonic logging tool that have been processed. First track 102 shows image of an internal radius of the casing, second track 103 shows casing internal radius at each depth (minimal 103A, maximal 103C and average 103B for each depth), third track 104 shows casing profile with indication of location of the internal 103A-103C and external 105 interfaces, fourth track 106 shows an image of a thickness of a casing, fifth track 108 shows casing thickness at each depth (minimal 109A, maximal 109C and average 109B for each depth) and sixth track 110 shows an acoustic impedance of the material behind the casing. For each of the image, the horizontal axis 111 represents an azimuth of the borehole. From the indicators relative to the casing, corrosion of exterior and interior surface of the casing may be estimated. The acoustic impedance of the material behind the casing in an indicator of the quality and distribution of the cement. For instance, from the acoustic impedance, it is possible to discriminate solids, liquids and gas that are behind the casing as their acoustic impedance is not of the same magnitude.

In the following we will particularly discuss the acoustic impedance image shown on track 110. Here, we have described a particular tool that is used to obtain an acoustic impedance image, as well as other measurements. However, for the method according to the disclosure, it does not matter how such image is obtained. For instance, the image may be obtained with other types of ultrasonic measurements such as flexural measurements obtained with tilted transmitter axially spaced from tilted receivers or by a combination of different measurements. The tool may or may not provide additional measurements such as the ones that are disclosed above, as long as it provides the image of the material behind the casing. It is also important to note that the method that will be disclosed in this application is applicable to other types of images of the material behind the casing that may be taken via acoustic tools or any other type of tools. The acoustic impedance is an exemplary imaging parameter only. Similarly, the tool and sonde 10 disclosed above are conveyed via a wireline cable but may possibly be conveyed by any possible conveyance element, such as a drill string, slickline, coiled tubing, etc.

The images such as acoustic impedance images mainly account for the material behind the casing but may also show disturbances that are relative to other elements of the wellbore, such as the casing. In particular, when the casing is perforated, these perforations generate disturbance, here high acoustic impedance zones on the acoustic impedance image, that are not in relationship with the material situated behind the casing. On FIG. 4, on log 202 showing raw data, as obtained from the tool, without any correction being applied to it, the perforation zone may be recognized for instance in zone 204, in which there is a plurality of dark zones (representing high acoustic impedance zones) of small size distributed around the image, each corresponding to a perforation. On this log, other azimuthally linear zones 206 having high acoustic impedances are seen at regular intervals along the depth axis. Such zones 206 may correspond for instance to a casing joint. Other high acoustic impedance zones 208 may be featured on the image but may correspond to a singularity of the material behind the casing. Therefore, a selective correction needs to be applied to the images to correct for features due to casing interaction without eliminating cement singularities.

The zones in which the disturbances appear do not give any information about the material that is situated behind it. The method according to the disclosure corrects images in order to minimize the influence of the disturbances and to estimate more accurately a property of the cement.

Figure 5:
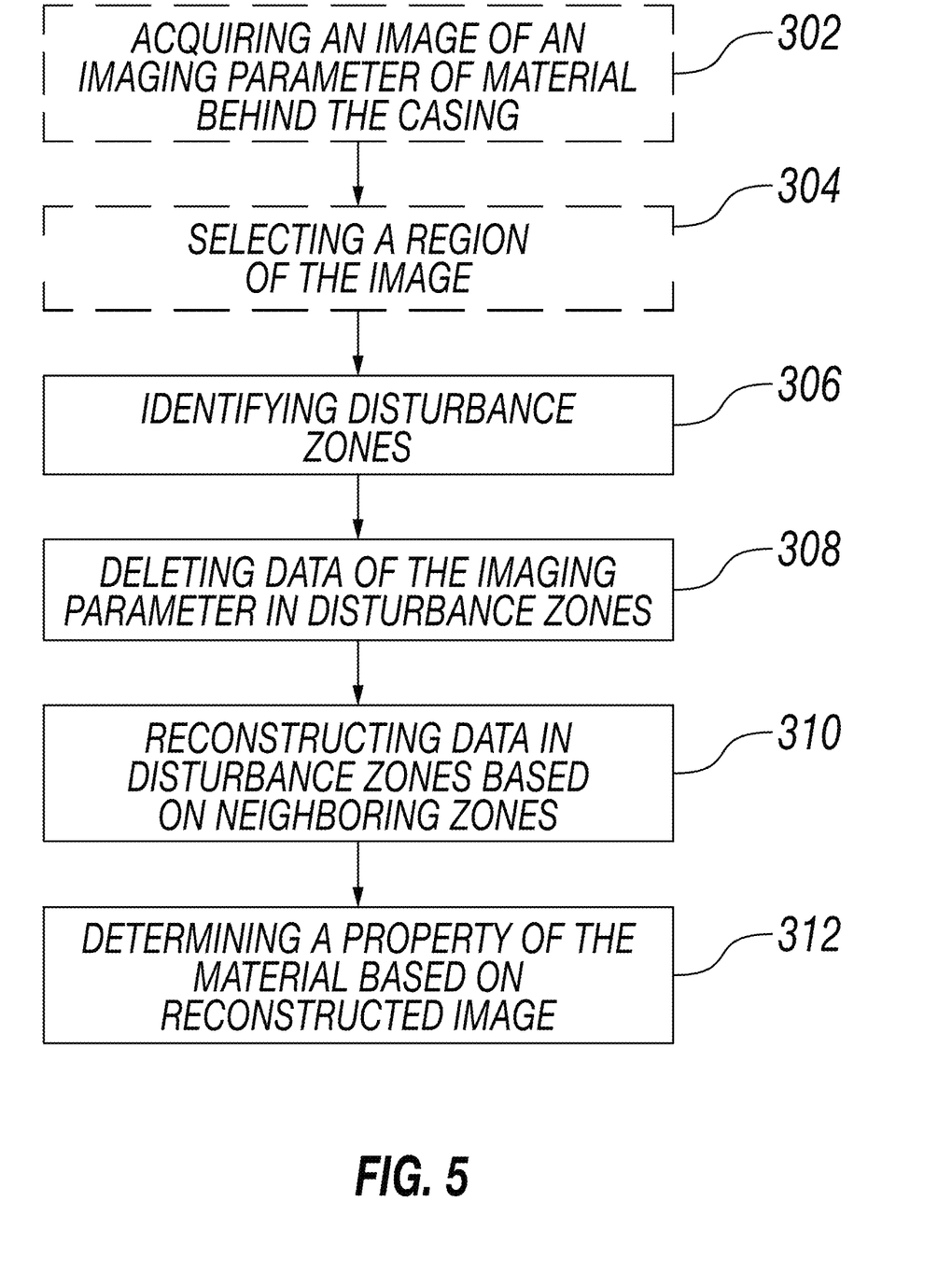
FIG. 5 is a flowchart of a method according to an embodiment of the disclosure.

The method according to an embodiment of the disclosure is shown in the flowchart 300 of FIG. 5.

The method may first comprise acquiring an image of an imaging parameter of the material behind the casing, i.e. cement (block 302). In one embodiment of the disclosure, the imaging parameter is an acoustic impedance and particular embodiments of the method will be explained relative to this particular imaging parameter. However, the method may be applied to an image representing any other parameter of the material that may be obtained via any type of device. Acquiring the image includes obtaining a measurement from a downhole tool, generally by transmitting a signal to the borehole and measuring its response. When the imaging parameter is an acoustic impedance, acquiring the image comprises as explained above transmitting ultrasonic pulses towards the casing, receiving ultrasonic waveforms and measuring an acoustic impedance of the material situated behind the casing based on the received waveforms. This operation is optional as the method may be performed on images that have been previously acquired and/or acquired by another system.

Then the method may comprise selecting a region of the image in which it is likely to have a disturbance zone (block 304). The region of the image may be selected for instance in view of the production plan indicating where the perforations likely to cause disturbance of the image are or based on an image analysis showing patterns that are registered as likely to indicate the presence of zones of disturbance in the region. This operation is once again optional as the correction may be applied to the entire image.

The method then comprises identifying disturbance zones in the image (block 306). The disturbance zones are identified only in the selected regions of the image when operation 304 has occurred. The identification is based on values of one of several parameters relative to the wellbore in the zone. The value of the parameter may be tested pixel by pixel. It may also be tested for a group of pixels, in particular if the method is performed in real-time, in order to decrease the computation time. In such case, values of the parameter are one or more statistical values for the group, such as average and median, that may be supplemented with variance or standard deviation for instance.

For instance, in a first embodiment of the disclosure, the identification is based on the value of the imaging parameter. The value of the imaging parameter is compared to a range of values that are considered as acceptable. This range of values may be predetermined to be the same for each borehole or can be determined based on values of one or more reference sections of the image of the same borehole. The reference sections of an image may be chosen so that it presents no disturbance, in which case the range of acceptable values may encompass the whole range of the values measured in that particular sections. When the value for the pixel or the group is outside of the acceptable range, it is flagged as a disturbance zone. The disturbance zones may be zones having anormally high values, anormally low values or both.

In a second embodiment, the identification may be based on the values of other parameters in the zone. For instance, when using an USIT tool delivering an image of the acoustic impedance, images of other parameters such as casing reflection amplitude, casing thickness and internal radius are computed (see for instance tracks 102 and 106 of FIG. 2). The casing anomalies that may affect the acoustic impedance image may be identified by using one or more of these indicators. For instance, as can be seen of FIG. 3, when there is a casing joint, the internal radius of the casing increases and the thickness decreases therefore showing indication that the measurement of the acoustic impedance may be disturbed. This would be the same with the perforations. Therefore, at a location having predetermined depth and azimuth, if the thickness or internal radius values are too different from a range of values, this may enable identifying that the acoustic impedance at the same location is disturbed. The range may be determined in view of casing nominal values or in view of the average of all of the measured values in the image or in certain regions of the image. Casing anomalies are however likely to disturb other types of measurements as well and such parameters may also be used if available to identify disturbance zones for other imaging parameters.

Other parameters may be used to flag disturbance zones, such as eccentricity of the tool. Indeed, if the eccentricity is outside a predetermined range at a predetermined depth, it may indicate that the measurement is not correct at this depth, and the values of the imaging parameter for all of the pixels at this depth should be flagged as a disturbance zone.

Both embodiments detailed above are only exemplary embodiments and other appropriate indicators using the parameters mentioned above or others could be used. For instance, the local variation of one of the thickness or internal radius may also be used. A combination of several parameters may also be used, such as a combination of the first and second embodiments of the identification described hereinabove.

Once the disturbance zones have been identified, the method includes deleting the data of the imaging parameter in each the disturbance zones from the image (block 308). The result of this operation is shown on second track 209 of FIG. 4. The zones highlighted in bright-green are zones in which the measured data have been deleted. It can be seen that the green zones (identifying deleted data) may have replaced high or low impedance values, that seem to correspond to a zone disturbed due to external elements (perforations, casing joints) as pointed out by arrows 210 or that look like low or high impedance values due to the material behind the casing itself, as pointed out by arrows 212.

The method then includes reconstructing for each disturbance zone acoustic impedance data based on the neighboring zones (block 310). Such reconstruction may be obtained based on training images stored in a database, the training images being a set of images taken in different wells of different environments devoid of disturbance zones. It comprises extracting patterns of these training images and then matching the patterns to the image of track 209, identify for each portion of the image the pattern that matches best with the image and reconstructing in the empty zones the data corresponding to the pattern. An example of an algorithm for reconstructing the image would be a FILTERSIM algorithm described in more details in article "*Filter-Based Classification of Training Image Patterns for Spatial Simulation*" (Zhang, Switzer, Journel). Any other appropriate algorithm may be used to do so.

Figure 4:
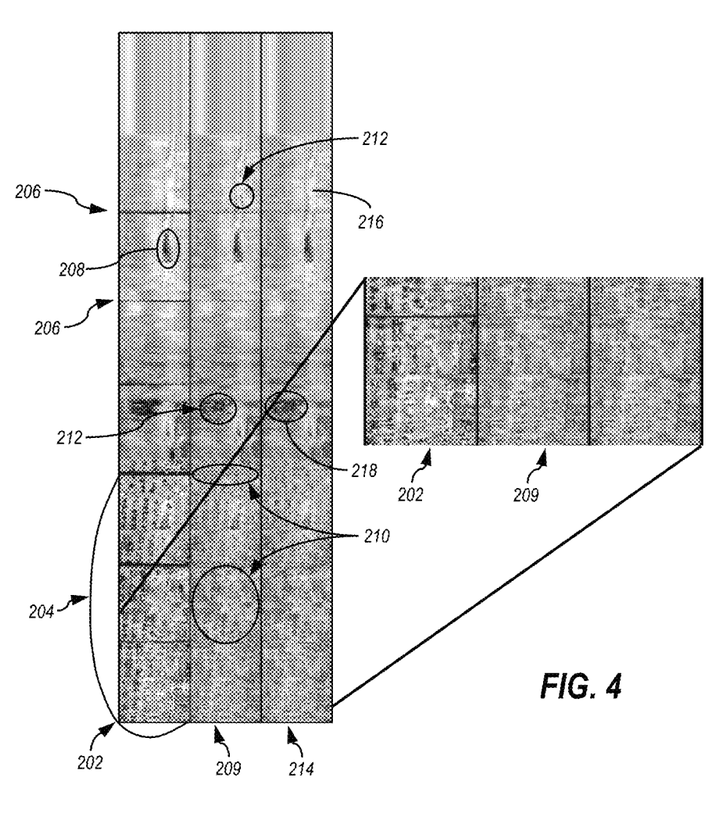
FIG. 4 shows a set of logs showing an impedance acoustic image after different operations of a method according to an embodiment of the disclosure are carried out and includes a more detailed section of the logs.

FIG. 4 shows on track 214 the reconstructed image resulting from the above-mentioned operation. As can be seen, the perforation zone 204 shows far less disturbance than on the image of track 202. This enables seeing more accurately the quality of the cement in that zone. It is also to be noted that the disturbances 208 have been eliminated. Regarding the features of the image that have been characterized as disturbance zones 212 but seem unrelated to the casing, it can be seen that the reconstruction has not eliminated them. The channel 216 is still visible on the reconstructed image as well as the pattern 218. Therefore, the reconstruction obtained from the algorithm enables minimizing the features of the image due to the casing without eliminating the features relative to the cement.

The method then includes determining a property of the material behind the casing based on the reconstructed image (block 312). This property may be the type of material that is behind the casing in each location (solid/liquid/gas) when the imaging parameter is an acoustic impedance. As the image has been corrected for features due to the casing, the property may be determined more accurately than with image 202 directly obtained from the tool.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method comprising:
   determining at least a property of a material situated behind a casing of a borehole, wherein the material comprises cement, wherein an image of an imaging parameter of the material has been obtained, and wherein the determining comprises:
   identifying zones of the image corresponding to disturbance zones;
   deleting the data of the imaging parameter in each of the disturbance zones;
   for each disturbance zone, reconstructing the data of the imaging parameter utilizing the data of the imaging parameter at neighboring zones; and determining at least a property of the material based on the reconstructed image.

2. The method of claim 1, wherein the imaging parameter is an acoustic impedance of the material.

3. The method of claim 1, wherein the disturbance zones are identified based on the value of at least one identification parameter in the zone.

4. The method of claim 2, wherein a zone is identified as a disturbance zone when the imaging parameter value in the zone is outside of a predetermined range.

5. The method according to claim 2, further comprising acquiring the image as an acoustic impedance image, wherein acquiring the image includes:
   transmitting ultrasonic pulses towards the casing of the borehole;
   receiving ultrasonic waveforms in response to the transmitted acoustic pulses; and
   based on received acoustic waveforms, measuring an acoustic impedance of the material behind the casing.

6. The method of claim 5, wherein acquiring the image includes forming the acoustic impedance image by plotting the measured acoustic impedance versus depth and azimuth.

7. The method of claim 3, wherein at least one of the at least one identification parameter is the imaging parameter.

8. The method of claim 3, wherein the predetermined range is determined based on values of the imaging parameter in at least a reference section of the image.

9. The method of claim 8, wherein the reference section is devoid of disturbance zones.

10. The method of claim 9, wherein the at least one identification parameter comprises a casing reflection amplitude, a casing thickness, an internal casing radius or an eccentricity.

11. The method of claim 3, wherein the at least one identification parameter comprises one or several parameters measured in the zone other than the imaging parameter.

12. The method of claim 1, wherein the identification is performed pixel by pixel.

13. The method of claim 1, further comprising selecting at least a region of the image and identifying the disturbance zones only in the region.

14. The method of claim 1, wherein reconstructing the imaging parameter data for one disturbance zone comprises:
   building patterns from training images of imaging parameter images devoid of disturbance zones; and
   constructing data of the imaging parameter in the disturbance zone utilizing the patterns and the imaging parameter data of zones neighboring the disturbance zone.

15. The method of claim 14, wherein reconstructing the data of the imaging parameter at each disturbance zone, utilizing the data of the imaging parameter at the neighboring zones, includes using a FILTERSIM algorithm.

16. The method of claim 1, wherein the disturbance zones are zones representative of perforated holes in the casing and/or casing joints.

17. A non-transitory tangible computer-readable medium, being stored with a computer program including instructions, wherein the instructions comprise:
   instructions for determining at least a property of a material behind a casing of a borehole based on an image of an imaging parameter of the material, wherein the material comprises cement, and wherein the instructions for the determining comprises:
      identifying zones of the image that correspond to disturbance zones;
      deleting the data of the imaging parameter in each of the disturbance zones;
      for each disturbance zone, reconstructing the data of the imaging parameter utilizing the data of the imaging parameter at neighboring zones; and
      determining at least a property of the material based on the reconstructed image.

18. A system for determining at least a property of a material behind a casing of a borehole based on an image of an imaging parameter of the material, wherein the system comprises at least one processor configured to:
   identify zones of the image that correspond to disturbance zones;
   delete the data of the imaging parameter in each of the disturbance zones;
   for each disturbance zone, reconstructing the data of the imaging parameter utilizing the data of the imaging parameter at neighboring zones; and
   determine at least a property of the material based on the reconstructed image;
   wherein the material behind the casing comprises cement.

19. The system of claim 18, further comprising a memory for storing the image and/or the reconstructed image.

20. The system of claim 19, wherein the imaging parameter is acoustic impedance, and wherein the system further comprises a downhole tool having:
   an ultrasonic transmitter for transmitting ultrasonic pulses towards the casing of the borehole; and
   an ultrasonic receiver for receiving ultrasonic waveforms in response to the transmitted acoustic pulses;
   wherein at least one of the at least one processor is configured to measure, based on received acoustic waveforms, an acoustic impedance of the material behind the casing and plot the acoustic impedance versus depth and azimuth to form the image.

* * * * *